United States Patent [19]

Cameron

[11] Patent Number: 4,644,105
[45] Date of Patent: Feb. 17, 1987

[54] MOBILE TELEPHONE CONTROLLER SWITCH

[75] Inventor: Joseph Cameron, Fort Thomas, Ky.

[73] Assignee: P.T.I., Inc., Fort Thomas, Ky.

[21] Appl. No.: 751,364

[22] Filed: Jul. 2, 1985

Related U.S. Application Data

[63] Continuation of Ser. No. 714,278, Mar. 25, 1985.

[51] Int. Cl.$^4$ .............................................. H04Q 7/04
[52] U.S. Cl. ..................................... 379/56; 379/63; 340/825.44
[58] Field of Search ................. 179/2 E, 2 EA, 2 EB, 179/2 EC; 455/58, 31; 370/31; 340/825.06, 825.12, 311.1, 825.44

[56] References Cited

U.S. PATENT DOCUMENTS

| | | | |
|---|---|---|---|
| 3,614,326 | 10/1971 | Cameron | 179/2 A |
| 4,087,636 | 5/1978 | Akiyama et al. | 179/2 EA |
| 4,178,475 | 12/1979 | Taylor et al. | 179/2 EC |
| 4,281,413 | 7/1981 | Forrest | 455/34 |
| 4,430,755 | 2/1984 | Nadir et al. | 455/77 |
| 4,431,991 | 2/1984 | Bailey et al. | 340/825.52 |
| 4,516,269 | 5/1985 | Krincock | 455/51 |
| 4,517,561 | 5/1985 | Burke et al. | 340/825.07 |
| 4,518,822 | 5/1985 | Martinez | 179/2 E |
| 4,543,665 | 9/1985 | Soteld et al. | 455/606 |
| 4,568,800 | 2/1986 | Orikasa | 179/2 EB |
| 4,600,922 | 7/1986 | Dunkerton et al. | 340/825.44 |

FOREIGN PATENT DOCUMENTS 0134540  8/1983  Japan ............................ 179/2 EC

*Primary Examiner*—Robert G. Lev
*Attorney, Agent, or Firm*—Wood, Herron & Evans

[57] ABSTRACT

A communication switch circuit is provided by which quasi-duplex communication may be had between a telephone party and a mobile unit in a simplex two-way radio communication system. Specifically, the communication switch circuit includes (i) a keying circuit to selectively energize a transmitter and (ii) an interrupt circuit to intermittently, temporarily deenergize the transmitter to permit reception from a mobile unit. The communication switch circuit further includes a control circuit which prevents reenergizing of the transmitter if a signal is received from a mobile unit while the transmitter is temporarily deenergized thereby permitting a mobile unit to interrupt the telephone party and interject a comment. The communication switch circuit also includes control circuits which permit a mobile unit to initiate and terminate calls.

30 Claims, 9 Drawing Figures

MOBILE TELEPHONE CONTROLLER SWITCH

RELATED APPLICATIONS

This Application is a continuation of application Ser. No. 714,278p, entitled Mobile Telephone Controller Switch, filed Mar. 25, 1985.

BACKGROUND OF THE INVENTION

I. Field of the Invention

The present invention pertains to over-the-air paging systems, and more particularly, to a "talk-back" or "two-way" paging arrangement by which the user of a portable or mobile pager unit may respond to pages or, alternatively, may initiate telephone calls.

II. Description of the Prior Art

One-way radio or receive-only "paging" systems have become increasingly popular in recent years including various sophisticated schemes for relaying information to the user. The original and best-known paging system generates a signal from a fixed-location transmitter in response to actuation of the transmitter by a telephone call being received. The transmitted signal is received by a mobile receiver or pager unit worn about the person. When the signal is received by the appropriate pager, the pager emits a "beep" thereby alerting the user that there is a message being held for him at a prearranged location or that he is to call a prearranged number. The user must then find an available telephone and call the prearranged location or number whereupon he is given his message.

Some paging systems may employ multiple tones, or multiple-tone pulse signaling to distinguish between several predetermined locations or numbers to be contacted for messages. By way of example, one particular sounding beep may signify that a call to the office is in order, while a different-sounding beep may indicate that the call should be to home, instead. More recent advances in pager technology include liquid-crystal-displays mounted to the exterior of the pager. The liquid-crystal-displays may be remotely loaded by the telephone caller to indicate, for example, the telephone number on which the caller can be reached.

A disadvantage of all such one-way paging systems is that the user of the pager unit cannot immediately speak with the call-initiating party directly. Instead, the user must locate an available telephone and place a call to the initiating party to return the page. A further drawback to a one-way paging system is that the pager cannot be utilized to initiate contact with someone else. Instead, the user must, again, locate an available telephone.

Alternatively, conventional two-way telephone and land-mobile communication services are available. Such services permit two-way communication such as is commonly encountered in telephone conversations. Conventional two-way radio telephone communications, however, require separate transmit and receive frequencies to permit simultaneous communication from the mobile unit to the telephone and from the telephone to the mobile unit. Thus, while such a duplex system permits telephone-like conversation, i.e., the ability to talk simultaneously and to interrupt the other party, it also requires the use of multiple radio channels. In many installations, this is impractical due to frequency congestion and channel assignments. Additionally, duplex systems may cost more than simplex or single channel systems such as are used for conventional one-way paging.

Simplex systems have also been used for two-way radio communication but with some drawbacks. In a typical simplex system, the transmitter and receiver operate at the same nominal frequency. To avoid interference, and other possible communication disruptive problems, the transmitter and receiver should not be energized at the same time. Hence, a keying circuit is typically provided which energizes the transmitter when the telephone party is talking so as to transmit these signals to the mobile unit. While the transmitter is energized, or keyed, the receiver is deenergized. When the telephone party stops talking, the keying circuit deenergizes the transmitter and re-energizes the receiver. While the receiver is energized, any signals transmitted by the mobile unit will be received by the receiver and heard by the telephoning party. One notable drawback is that the simplex two-way radio communications system does not permit both parties to talk at the same time, nor can one party interrupt or interject a comment while the other person is talking (i.e., transmitting).

Systems designed for simplex operation thus require a certain degree of user education from the standpoint that persons accustomed to conventional telephone communications must refrain from speaking until the other party has completed its transmission. Failure to wait out the transmission of the other party will result in the interrupter's message not being heard. This inability to interrupt may also result in channel capturing whereby one party or the other can lock up the channel precluding its use by others.

As discussed, in a typical simplex two-way communication system, the originating caller may be using a telephone to gain access to a base station having a transmitter and a receiver which are adapted for simplex communications with a mobile transceiver. Once the communication link is established, only one or the other party may talk at any given time. When the telephone party talks, for example, the transmitter is energized such that telephone signals (e.g., the caller's voice) can be transmitted to and received by the mobile transceiver. During transmission by the transmitter, the receiver is deenergized. Hence, so long as the telephoning party is talking, no messages can be received at the base station. As a result, for so long as the telephone party is talking, the mobile transceiver user cannot interrupt to terminate the conversation or to interject a comment. In this way, the telephone caller can lock up or capture the channel precluding others from communicating through the base station.

Accordingly, it is an object of the present invention to provide a communication switch circuit for a simplex two-way radio communication system which avoids channel lockup by the telephoning party.

A further objective of the present invention is to provide a communication switch circuit for a simplex two-way radio communication system which will permit a mobile unit such as a pager adapted to transmit to interrupt a telephoning party to interject a comment.

An even further objective of the present invention is to provide a communication switch circuit to permit a transmitting mobile unit to initiate a call to a telephone party.

A yet further objective of the present invention is to provide a communication switch circuit which permits a transmitting mobile unit to terminate the connection between a telephone party and the mobile unit.

It is a further objective of the present invention to provide a communication switch circuit meeting the above objectives and compatible for use in one-way pager systems and/or with duplex radio communication systems.

SUMMARY OF THE INVENTION

In accordance with the present invention and in its broadest aspects, there is provided a communication switch circuit by which quasi-duplex communication may be had with a simplex two-way radio communication system wherein the keying circuit includes an interrupt circuit to intermittently, temporarily deenergize the transmitter and reenergize the receiver. The communication switch circuit is further provided with a control circuit which prevents energizing of the transmitter (and deenergizing of the receiver) if a signal is received by the receiver during the temporary interrupt thereby permitting a mobile unit to interrupt the telephone party and interject a comment.

More specifically, the present invention provides a communication switch circuit having a first circuit which couples a telephone line to a transmitter when signals are not being received by a receiver to define a transmission state; a keying circuit which permits the transmitter to transmit signals, when signals are present on the telephone line and the first circuit is in the transmission state to define a transmitter-on state, and which prevents the transmitter from transmitting signals in a transmitter-off state; the first circuit, in a receiver state, coupling the telephone line to the receiver when signals are being received by the receiver and the keying circuit is in the transmitter-off state; and an interrupt circuit operable when the keying circuit is in the transmitter-on state, which intermittently, temporarily places the keying circuit in the transmitter-off state, whereby signals transmitted by the mobile unit when the keying circuit is temporarily in the transmitter-off state may be received by the receiver to prevent further transmission by the transmitter during reception of the mobile unit signals. Also, during an interrupting reception, signals received from the receiver will place the first circuit in the receiver state whereby signals received from the mobile unit are coupled to the telephone line.

Preferably the communication switch circuit of the present invention is adapted to permit reception of telephone calls from a telephone party as well as to permit a mobile unit to initiate and terminate calls. In preferred embodiments, the first circuit is coupled to a circuit node rather than directly to the telephone line, and the telephone line is selectively couplable to the node under control of a first control circuit which monitors the telephone line. The first control circuit includes a first switch circuit by which the telephone line and node may be coupled. Preferably the telephone line is normally uncoupled from the node, i.e., the first switch circuit is in an on-hook state and the telephone line is idle. Also, the first circuit is normally in the transmission state. When a telephone party calls in or the telephone line is otherwise in use, i.e., has signals thereon, the first control circuit will couple the telephone line to the node, i.e., the first switch circuit will be placed in an off-hook state, thereby permitting operation as above. Hence, a telephone party can initiate communications.

The communication switch circuit further preferably comprises a second control circuit which monitors the node. When the keying circuit is in the transmitter-off state, which occurs when no signals are present at the node or the first switch circuit is in the on-hook state, the receiver is energized. Hence, signals can be received from the mobile unit. Once signals are received, the first circuit will be placed in the receiver state whereby received signals are coupled to the node to be monitored by the second control circuit notwithstanding that the telephone line is on-hook. In response to a first predetermined signal at the node, the second control circuit couples the receiver to the telephone line thereby placing signals on the telephone line causing the first control circuit to place the first switch circuit in the off-hook state and thereby to initiate a call. In response to a second predetermined signal at the node, the second control circuit will cause the first control circuit to place the first switch circuit in the on-hook state thereby uncoupling the telephone line from the node and terminating a call.

By virtue of the foregoing, a telephoning party cannot lock-up a channel and a mobile or pager unit can interrupt the telephoning party. Further, the pager unit can initiate connection to a telephone line to place a call and can also terminate such a connection.

The communication switch circuit may also preferably be provided with a timer circuit which will automatically terminate the connection after a predetermined period of time. With a two-way communication system, the timer will be reset whenever either the telephone party speaks or signals are received from the mobile unit thereby reinitiating the predetermined period of time. When used with a pager in a one-way system, no signals will be received by the receiver and, hence, the connection will be terminated after the telephone party hangs up. In this way, the communication switch circuit of the present invention may be used in a one-way pager system or in combination with both one-way and two-way communication systems.

For proper operation of a duplex communication system, signals from the receiver must be coupled to the transmitter for retransmission along with signals from the telephone line. To this end, the communication switch circuit of the present invention is also preferably provided with a unidirectional combiner which couples signals from the receiver to the transmitter. Although receiver signals will be present at the transmitter even in a simplex communication system due to the combiner, that is of no consequence due to the non-coincidence of operation of the transmitter and receiver. Hence, the communication switch circuit of the present invention is compatible for use in one-way paging systems and duplex radio communication systems.

BRIEF DESCRIPTION OF THE DRAWINGS

The above objectives and advantages of the invention will become more readily apparent from the following detailed description taken with the accompanying drawings in which.

DETAILED DESCRIPTION OF THE DRAWINGS

Figure 1:
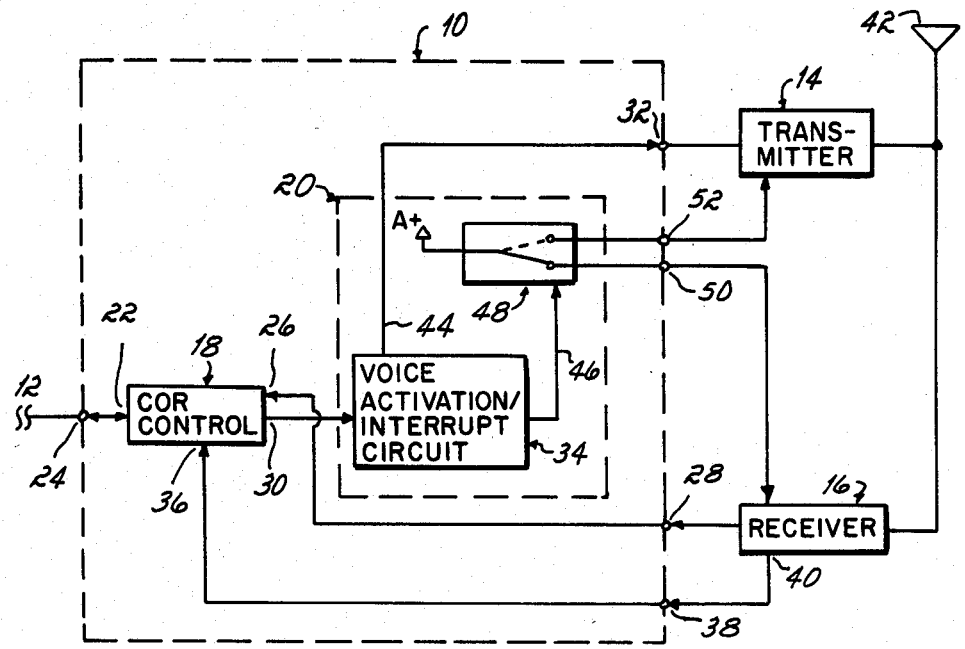
FIG. 1 is a block diagram of one embodiment of the communication switch circuit according to the principles of the present invention.

With reference to FIG. 1, there is shown a block diagram of one embodiment of a communication switch circuit 10 in accordance with the principles of the present invention. Communication switch circuit 10 is adapted to permit selective coupling of signals between a land line 12 such as a telephone line or other link to a communication network (not shown), a transmitter 14, and a receiver 16 as determined by the state of COR control 18. COR control 18 is preferably a double-throw transistor-driven relay or the like. Terminal 22 of COR control 18 is coupled to telephone or land line 12 via telephone port 24; terminal 26 is coupled to receiver 16 via receiver port 28; and terminal 30 is coupled to transmitter 14 via transmitter port 32 through voice activation/interrupt circuit 34 of keying circuit 20 as will be discussed below.

COR control 18 further has a control terminal 36 coupled to a COR output 40 of receiver 16 via COR port 38. Receivers typically utilized in communication systems are configured to provide a signal from a carrier-on-relay (COR) or the like which indicates that signals are being received by the receiver. That signal is referred to herein as a COR signal. Of course, the receiver must be energized to receive signals. Hence, receiver 16 includes a COR output 40 which provides a COR signal whenever receiver 16 is energized and is receiving signals from antenna 42 within the passband of the receiver, e.g., from a mobile unit (not shown) operating on the same channel. The presence of a COR signal at the COR port 38 thus corresponds to the presence of signals at receiver port 28.

When signals are present at receiver port 28, the corresponding COR signal places COR control 18 in a receiver state whereby terminals 22 and 26 thereof are coupled one to the other. Thus, in the receiver state, signals from receiver 16 are received at telephone line 12. When receiver 16 is either deenergized or otherwise not receiving a signal, there is an absence of signals at receiver port 28, with a corresponding absence of a COR signal at COR port 38. The absence of a COR signal places COR control 18 in a transmission state whereby terminals 22 and 30 are coupled one to the other. Thus, in the transmission state, signals from telephone line 12 are coupled to transmitter 14 for transmission thereby (through a suitable antenna 42).

Keying circuit 20, which selectively energizes and deenergizes transmitter 14 and receiver 16, includes voice activation/interrupt circuit 34, one output 44 of which couples signals at terminal 30 of COR control 18 to transmitter port 32. The other output 46 of voice activation/interrupt circuit 34 provides a control signal to power switch 48 which controls energization and de-energization of transmitter 14 and receiver 16.

Transmitter 14 and receiver 16 are preferably configured for simplex operation and thus operate at the same nominal frequency. As is well understood, proper operation of a simplex system requires that the transmitter and receiver not be energized simultaneously. Hence, power switch 48, which may be a conventional Darlington transistor switch, is adapted to provide power only to transmitter 14 or receiver 16 at any one time, but not both.

Power switch 48 has a transmitter-off state shown in solid line in FIG. 1 wherein a source of supply (A+) is coupled to receiver 16 via power port 50 thereby energizing receiver 16. Transmitter 14 is coupled to power port 52 which is coupled to the source of supply (A+) when power switch 48 is in a transmitter-on state as shown in dotted line in FIG. 1. As will be appreciated, power switch 48 will energize only one of transmitter 14 and receiver 16 at a time, the other being de-energized.

In the transmitter-on state, therefore, receiver 16 is deenergized and transmitter 14 is energized thus permitting transmission over antenna 42 of signals present at transmitter port 32. In the transmitter-off state, receiver 16 is energized and transmitter 14 is de-energized thus preventing transmission by transmitter 14 of signals present at transmitter port 32.

As mentioned, voice activation/interrupt circuit 34 provides signals on control output 46 which place power switch 48 in the transmitter-on and transmitter-off states as appropriate. Voice activation/interrupt circuit 34 is operable in response to signals present at terminal 30 of COR control 18. Hence, only when COR control 18 is in the transmission state can signals be present at terminal 30 (from telephone port 24). When no signals are present thereat, voice activation/interrupt circuit 34 provides a disable signal on output 46 which places power switch 48 in the transmitter-off state. However, for so long as signals are present at terminal 30, voice activation/interrupt circuit 34 provides an enable signal on output 46 which places power switch 48 in the transmitter-on state.

While power switch 48 is in the transmitter-on state, signals cannot be received by receiver 16. To avoid channel lock-up, voice activation/interrupt circuit 34 is configured to intermittently, temporarily generate a disable signal on output 46 notwithstanding that signals are present at terminal 30. As a result, whenever power switch 48 is in the transmitter-on state, it will occasionally be placed in the transmitter-off state whereby signals may be received by receiver 16.

Should signals be received by receiver 16 while power switch 48 is temporarily in the transmitter-off state, a COR signal will be generated on COR output 40. As a result, COR control 18 will be placed in the receiver state precluding the presence of signals at terminal 30. Thus, power switch 48 will be maintained in the transmitter-off state while receiver 16 is receiving. Accordingly, communication switch circuit 10 of the present invention advantageously prevents channel lockup and permits the user of a mobile unit (not shown) to interrupt transmission of signals from telephone line 12.

Figure 2:
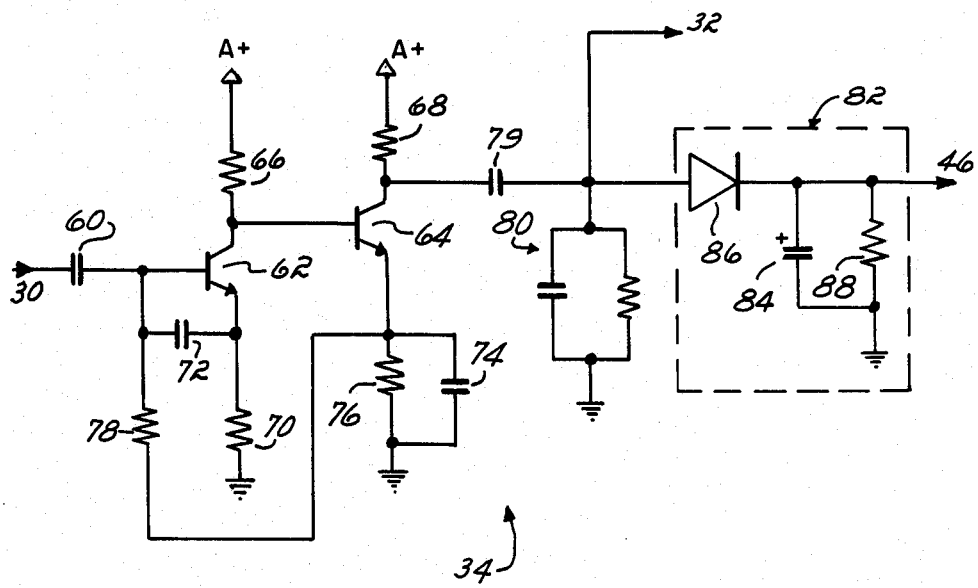
FIG. 2 is a schematic diagram of the voice activation-/interrupt, circuit of FIG. 1.

With reference to FIG. 2, there is shown the voice activation/interrupt circuit 34 in greater detail. Signals from terminal 30 of COR control 18 are coupled through capacitor 60 to the input (base of transistor 62) of a cascaded pair of common emitter NPN transistor amplifiers 62 and 64. The collectors of transistors 62 and 64 are coupled to a source of supply (e.g., A+) via bias resistors 66 and 68, respectively. The emitter of transistor 62 is coupled to ground through resistor 70 and is bootstrapped to its base by capacitor 72. Similarly, the emitter of transistor 64 is coupled to ground through parallel capacitor 74 and resistor 76. The emitter of transistor 64 is coupled to the base of transistor 62 via resistor 78.

Transistors 62 and 64 in the configuration shown in FIG. 2 operate to provide an interrupt circuit in response to signals at terminal 30. Resistor 66 biases transistor 64 into conduction, the emitter voltage of which, in turn, biases on input transistor 62 through resistor 78. In this manner, the two-stage amplifier is biased into a generally linear amplifying mode whereby signals are present at the collector of transistor 64 for purposes to be discussed hereafter. Transistor 64, however, is close to saturation (i.e., with a collector-to-emitter voltage thereacross of approximately one volt).

Upon application of sustained signal from terminal 30, capacitor 74 charges up. As capacitor 74 charges, the bias point of transistor 64 is driven generally toward cut-off which results in a lower emitter voltage (i.e., a lower voltage across resistor 76) eventually, in turn, cutting-off input transistor 62. When input amplifier 62 is cut off, signals from terminal 30 are precluded from reaching transistor 64 and, hence, no signals will be present at the collector of transistor 64 until capacitor 74 (which is typically 33 microfarads) sufficiently discharges through resistor 76 (typically 1.2 kilohms) to once again permit conduction of transistor 62 to define an interrupt cycle. Once transistor 62 again begins to conduct, the above-described interruption cycle is repeated until signals are no longer present at terminal 30. The interrupt cycle is repeated approximately every five seconds when signals are present at terminal 30. It will be appreciated that in the absence of signals at terminal 30, transistor 64 will return to its quiescent, near saturation state which, in turn, again enables the input amplifier stage 62.

The collector of transistor 64 is coupled by coupling capacitor 79 to transmitter port 32, parallel RC tank circuit 80 and the input of timer 82. The output 46 of timer 82 provides the aforedescribed enable signal to power switch 48 when capacitor 84 is charged above the predetermined voltage necessary to place power switch 48 in the transmitter-on state. Below that voltage, timer 82 provides the aforedescribed disable signal.

As signals from terminal 30 are coupled to timer 82 and are rectified by diode 86, capacitor 84 becomes charged. Capacitor 84 remains charged for as long as signals are present at the collector of transistor 64. In the absence of signals, due either to the interruption cycle or lack of signals at terminal 30, timing capacitor 84 will discharge through resistor 88. This discharge period is necessary to provide a delay in generating the disable signal to assure that the transmitter does not "drop out" between insignificant gaps in signals at terminal 30, such as that which occurs between syllables or words when a person talks. The time constant of capacitor 84 and resistor 88 must also be sufficiently short so as to permit generation of a disable signal during the time frame in which transistor 62 is cut-off to permit sufficient time for power switch 48 to energize receiver 16 to permit reception of signals, if any.

In operation of communication switch circuit 10, COR control 18 will normally be in the transmission state. Hence, absent a COR signal from receiver 16, signals at telephone port 24 will be coupled to transmitter port 32 via voice activation/interrupt circuit 34. Also, voice activation/interrupt circuit 34 will provide an enable signal on line 46 placing power switch 48 in the transmitter-on state thereby permitting transmitter 14 to transmit the signals from telephone port 24. Voice activation/interrupt circuit 34 will occasionally output a temporary disable signal on output 46 for a time sufficient to permit receiver 16 to receiver signals, if any, but for a sufficiently short duration as not to create a noticeable effect during reception by a mobile unit (not shown) if no interrupting signal is received. If an interrupting signal is received, a COR signal will be present at COR port 38 placing COR control 18 in the receiver state precluding generation of a further enable signal by voice activation/interrupt circuit 34 until after the interrupting signal terminates.

When no signal is present at telephone port 24, power switch 48 is in the transmitter-off state whereby receiver 16 is energized. When signals are present at receiver terminal 28, COR control 18 is placed in the receiver state to couple telephone port 24 to receiver port 28 until signals are once again absent from receiver port 28.

Figure 3:
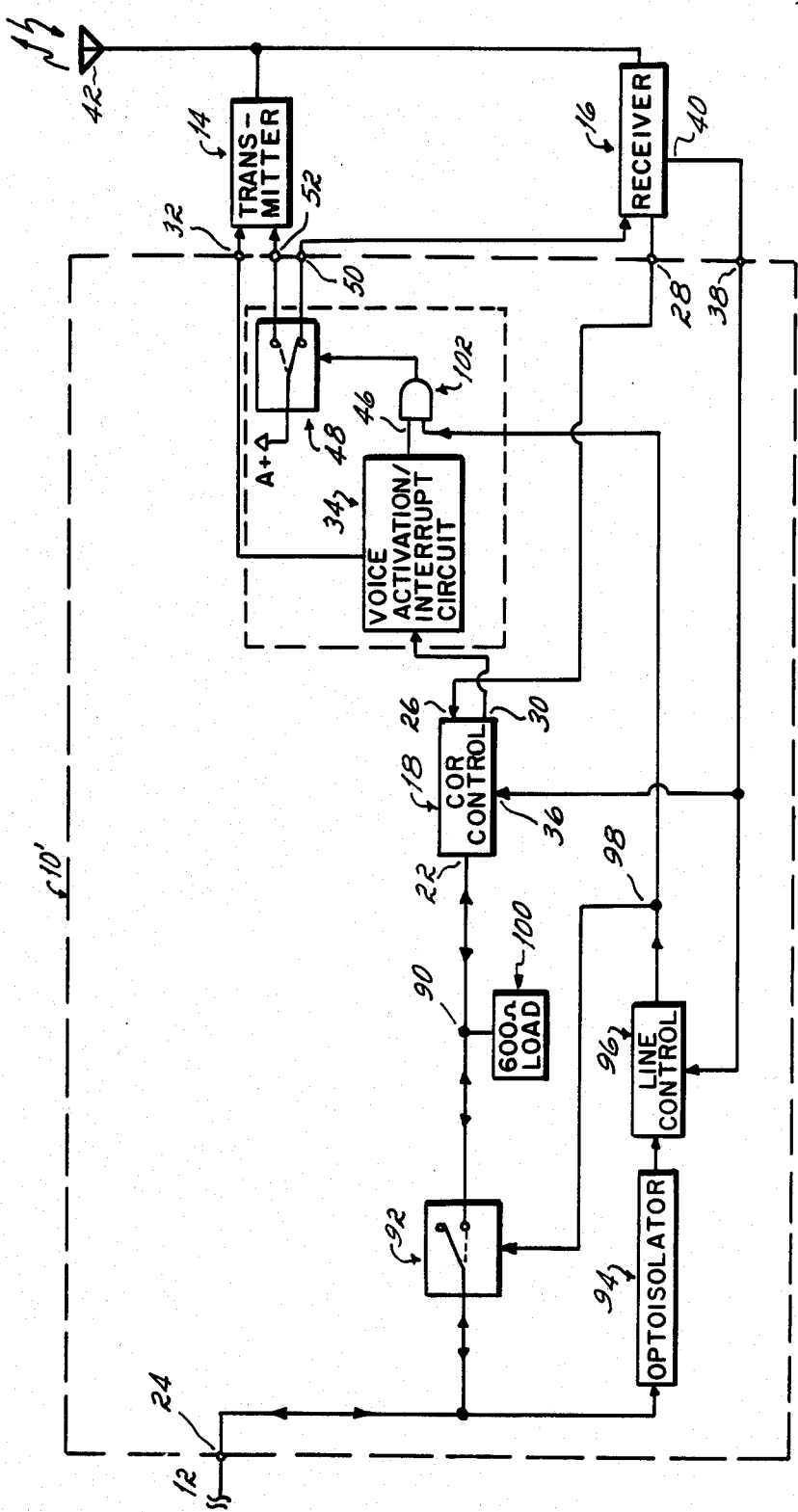
FIG. 3 is a block diagram of an alternative embodiment of the communication switch circuit according to the principles of the present invention.

Reference will now be had to FIG. 3 showing an alternative embodiment of communication switch circuit 10' of the present invention. Communication switch circuit 10' operates in substantially the same manner as communication switch circuit 10 but further includes circuitry adapted to permit a telephone caller, for example, to call the communication switch circuit 10'. The added circuitry operates to "answer" the call by "seizing" telephone line 12 and thereafter permitting operation as above described in connection with communication switch circuit 10.

In the alternative communication switch circuit 10', terminal 22 of COR control 18 is not coupled directly to telephone port 24 but is coupled thereto via a node 90 and a switch 92. Switch 92 is shown in solid line in its normally open or on-hook state in FIG. 3. In the on-hook state, signals at telephone port 24 are not coupled to node 90 by switch 92 in which event no communication can be had between telephone line 12 and transmitter 14 or receiver 16. Switch 92 has a closed or off-hook state shown in dotted line in FIG. 3 wherein telephone port 24 and node 90 are coupled permitting operation of communication switch circuit 10', generally, as described in connection with communication switch circuit 10.

Communication switch circuit 10' is provided with optoisolator 94 and line control 96 which cooperate to control the state of switch 92 as well as power switch 48. Optoisolator 94 is of sufficiently high impedance as to appear virtually "invisible" to telephone line 12. Hence, therefore, when switch 92 is in the on-hook state as shown in FIG. 3, telephone line 12 is electrically "on-hook", that is unanswered. When a call is received on telephone line 12 or telephone line 12 is otherwise in use as will be discussed hereafter, signals will be present at telephone port 24. These signals will trigger optoisolator 94 which in turn will trigger line control 96.

Line control 96 typically outputs an on-hook or low signal from its output 98. The on-hook signal places switch 96 in the on-hook state. However, when line control 96 is triggered by optoisolator 94, line control 96 will output an off-hook or high signal on line 98. Switch 92 will be placed in the off-hook state whenever output 98 has an off-hook signal. Thus, in response to ringing voltage on telephone line 12, for example, switch 96 will be placed in the off-hook state by line control 96 thereby coupling telephone port 24 to node 90. Coupled to node 90 is a conventional 600 ohm resistive load 100 which, as is well understood, is the proper impedance to answer or seize a telephone line and maintain a connection with the telephone company equipment (not shown). As is well known, upon sensing a 600 ohm load in a line, the telephone company equipment deems the telephone link completed and stops the ringing and permits communication over the telephone line.

Power switch 48 is responsive to the output of AND gate 102. Output 46 of voice activation/interrupt circuit 34 and output 98 of line control 96 are coupled to respective inputs of AND gate 102. Hence, power switch 48 will be placed in the transmitter-on state only when voice activation/interrupt circuit 34 generates an enable signal as described above and line control 96 generates an off-hook signal. At all other times, power switch 48 is placed in its transmitter-off state. Hence, for so long as line control 96 generates the off-hook signal, operation of communication switch circuit 10' will be like that of communication switch circuit 10.

Figure 4:
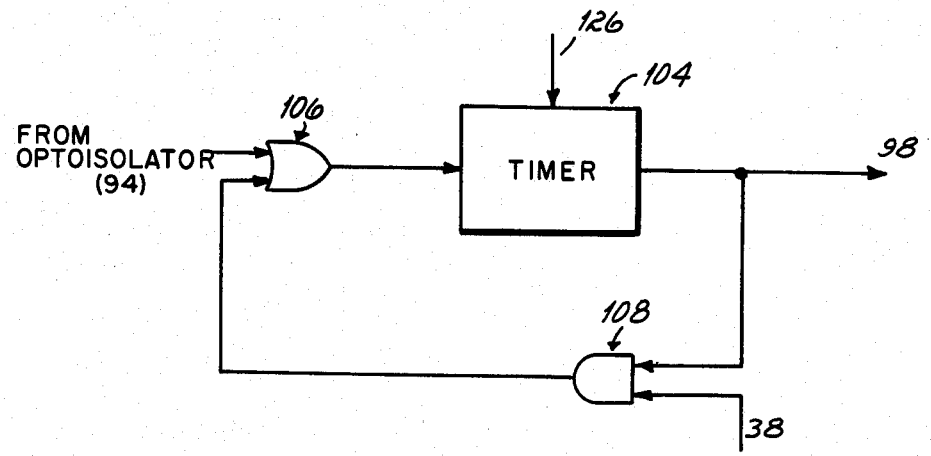
FIG. 4 is a block diagram of the line control of FIG. 3.

With additional reference now to FIG. 4, line control 96 (FIG. 3) is also responsive to COR signals from COR port 38. As can be seen from FIG. 4, line control output 98 (coupled to the switch 92 and the AND gate 102) is the output of a timer 104 in the line control 96. Timer 104 normally provides an on-hook (or low) signal until triggered by a signal from OR gate 106. OR gate 106 triggers timer 104 in response to signals from optoisolator 94 or from AND gate 108. As will be appreciated, AND gate 108 cannot provide a signal to OR gate 106 unless timer 104 has already been triggered by a signal from optoisolator 94 to provide an off-hook (or high) signal. Thereafter, a COR signal from COR port 38 will be passed by AND gate 108 to OR gate 106 to trigger timer 104. Hence, whenever signals are present at telephone port 24 or signals are present at receiver port 28 (after signals have first appeared at telephone port 24), timer 104 will be triggered and will provide, for a predetermined period of time, an off-hook signal which will determine the period of time during which switch 92 is placed in the off-hook state.

Timer 104 may be reset or retriggered whenever a signal is provided by OR gate 106 as described. Hence, the predetermined period of time will begin anew whenever signals are present at telephone port 24 or receiver port 28 to maintain connection of telephone line 12 to node 90. Once timer 104 has timed out before any such further signal is received, output 98 will become an on-hook signal whereby telephone line 12 will be disconnected from node 90 and only signals at telephone port 24 can re-establish the connection.

Timer 104 may be advantageously set to operate between fifteen seconds and several minutes but is preferably adjustable to permit selection of the predetermined period of time during which telephone line 12 is seized. Timer 104 may be of any conventional design, for example, as shown in FIG. 5.

Figure 5:
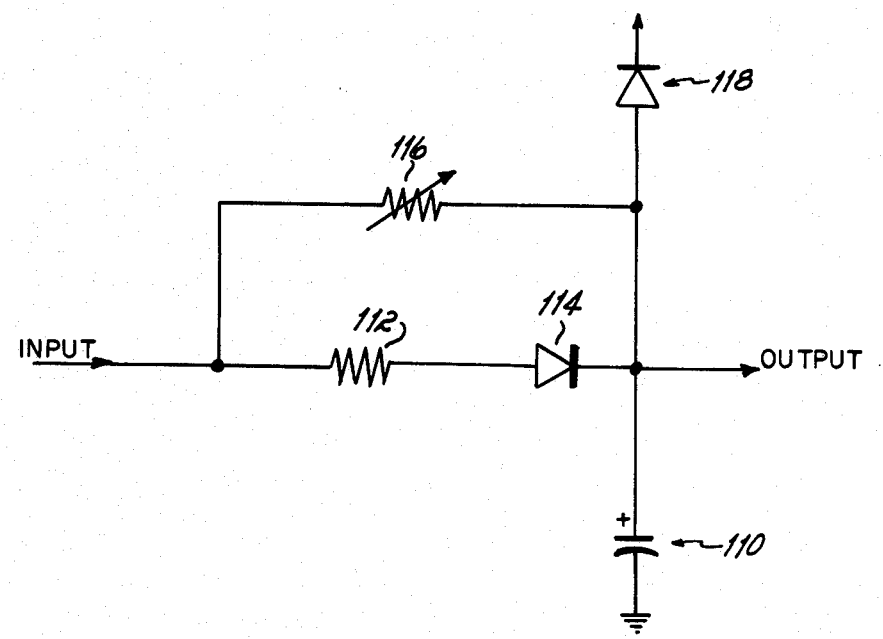
FIG. 5 is a schematic diagram of the timer of FIG. 4.

The timer shown in FIG. 5 includes timing capacitor 110, resistor 112 for rapidly charging capacitor 110 through diode 114 when a high voltage is present at the INPUT, and variable resistor 116 for discharging capacitor 110 when a low voltage is present at the INPUT. Thus, the timer of FIG. 5 is initially set by a high level signal at the INPUT which rapidly charges capacitor 110. The timer interval commences when the signal at the INPUT returns to a low level thereby permitting discharge of capacitor 110 through resistor 116. Resistor 112 is typically of a relatively low value to facilitate rapid charging of capacitor 110, for example, 4.7 kilohms. Diode 114 blocks the reverse flow of current through resistor 112 to thereby preclude capacitor discharge through this path. Rather, resistor 116, which may advantageously be adjustable to permit selectable timer intervals, serves as the discharge path. Thus, it will be appreciated that the timer interval is set by the time constant of capacitor 110 and resistor 116. These values will of course vary according to the timing function intended, but, as an example, one form of the timer 104 includes a 47 microfarad capacitor 110 and one megohm adjustable resistor 116. Further, timer 104 includes a diode 118 for purposes to be explained in connection with FIG. 6 below.

Communication switch circuit 10' may be employed in a simplex two-way radio communication system as described but may also be utilized for more conventional one-way paging by virtue of line control 96. As mentioned, timer 104 will place switch 92 in its on-hook state if no signals are present at telephone port 24 or receiver port 28 for a predetermined period of time. In a one-way pager system, no signal will be received from the pager and, hence, once the telephoning party has completed his message, timer 104 will time out and disconnect the call (i.e., hang up) to await the next call. Hence, the communication switch circuit 10' of the present invention may be utilized with both two-way and one-way systems as determined solely by the characteristics of the mobile unit.

The communication switch circuit of the present invention may also be adapted to permit a mobile unit to initiate and terminate telephone calls. In this regard, reference is had to the alternative embodiment of communication switch circuit 10" shown in FIG. 6. Communication switch circuit 10" operates in substantially the same manner as communication switch circuit 10' but also includes circuitry adapted to monitor signals from the receiver whereby in the presence of certain predetermined signals for a predetermined duration, calls may be initiated and/or terminated. To this end communication switch circuit 10" also includes a tone decode control 120 which monitors node 90 to generate control signals to a second switch 122 and to line control 96, on outputs 124 and 126, respectively.

It will be remembered that the presence of signals at telephone port 24 causes optoisolator 94 to trigger line control 96 thereby placing first switch 92 in the off-hook state for operation as described. Ordinarily, receiver port 28 is not coupled to telephone port 24 except via COR control 18 once switch 92 has been placed in the off-hook state. However, node 90 may be coupled to receiver port 28 when signals are present at the latter even if switch 92 is on-hook. Thus, by monitoring node 90 for certain predetermined signals, tone decode control 120 (in the communication switch circuit 10") permits initiation and termination of calls by a mobile unit as will now be described.

Switch 122 has a no-call state shown in solid line, in which telephone port 24 is not coupled to receiver port 28 by switch 122. Switch 122 also has a mobile-call state, shown in dotted line, in which ports 24 and 28 are coupled thereby. Switch 122 is responsive to an access signal generated by tone decode control 120 at output 124. When a first predetermined signal appears at node 90, tone decode control 120 generates an access signal on output 124 which places switch 122 in the mobile-call state. As a result, telephone port 24 is coupled to port 127 to which is also coupled 600 ohm resistive load 128. As ohm load 128 seizes telephone line 12. Once seized, dial tone or other signals (such as from receiver port 28) will be present at telephone port 24 triggering optoisolator 94.

Tone decode control 120 is also responsive to a second predetermined signal at node 90 to generate a dump signal on output 126. In response to the second predetermined signal at node 90 (from telephone line 12 or receiver 16), a dump signal will be generated which will force timer 104 (FIG. 4) of line control 96 to output the disable signal on line 98 thereby placing switch 92 in the on-hook state. Also, when a dump signal is generated on output 126, the access signal on output 124 terminates thus placing switch 122 in the no-call state. As a result, the call is terminated. In the particular embodiment hereindescribed, output 126 is typically a high voltage but in response to the second predetermined signal at node 90, will become a low voltage thereby rapidly discharging timing capacitor 110 through diode 118 (FIG. 5) resulting in the disable signal.

Figure 7:
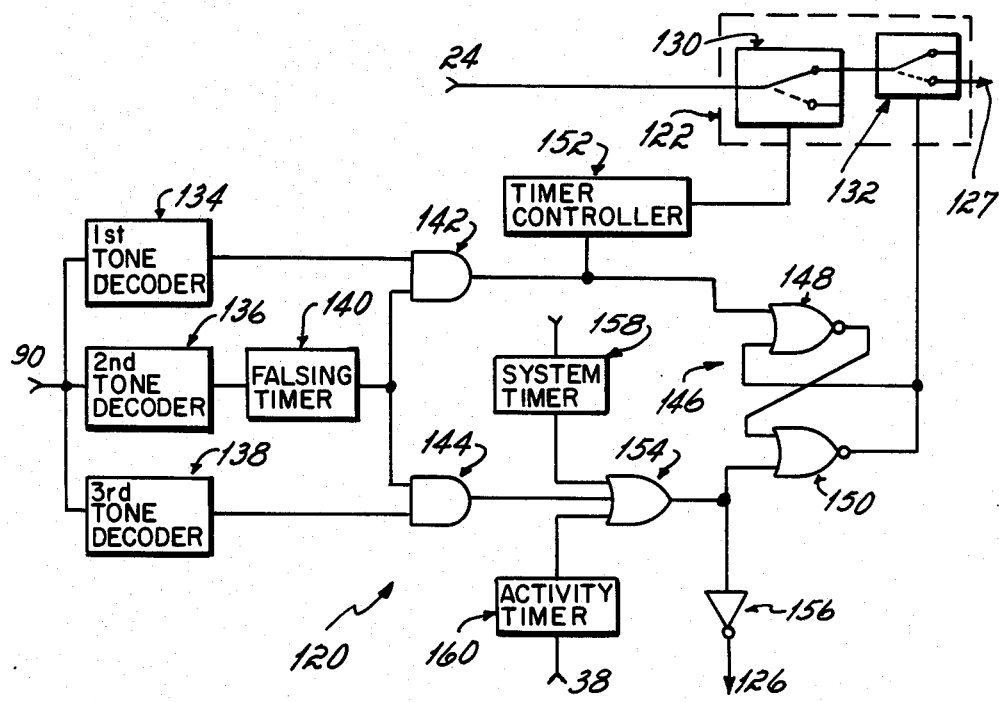
FIG. 7 is a block diagram of the tone decode control of FIG. 6.

Reference will now be had to FIG. 7 illustrating a preferred embodiment of tone decode control 120 and second switch 122. Second switch 122 may be a single switch or, as illustrated, a pair of series-connected switches 130 and 132. The use of independent switches merely represents an expedient and it will be appreciated that a single switch may be controlled to achieve the same results as the two switch arrangement discussed herein.

Signals at node 90 are provided in parallel to the inputs of three tone decoders 134, 136 and 138, respectively. A variety of tone decoders will perform satisfactorily although the "567" integrated circuit phase-locked loop type, available from National Semiconductor, Santa Clara, Calif., is sufficient where the falsing timer 140, described hereinafter, is utilized.

Tone decode control 120 is configured to independently decode standard telephone two-tone digits having a common tone, that is, two digits falling within either the same column or row of a standard push-button touch-tone telephone keyboard. Second tone decoder 136 is "tuned" to detect this common tone frequency while first tone decoder 134 and third tone decoder 138 are tuned to the second and third non-common tone frequencies, respectively, comprising each of the respective two digits. Thus, when the two audio tones corresponding to the first or access digit, such as an asterisk on a standard push-button telephone keyboard, are present at node 90, first and second tone decoders 134 and 136, respectively, generate enable or high signals. The access digit tones may be generated by a mobile unit (not shown) which has been provided with a standard push-button telephone keyboard. Similarly, when the two tones corresponding to the second or dump digit, such as corresponding to the pound key on the telephone keyboard, are present at node 90, second tone decoder 136 and third tone decoder 138 generate enable or high signals.

First digit tones, represented by enablement of first and second tone decoders 134 and 136, indicate that a mobile unit seeks access to place a call. Second digit tones, represented by the enablement of second and third tone decoders 136 and 138, indicates that the call is to be terminated.

The output of common second tone decoder 136 is connected through a falsing timer 140 to one input of each of inhibit AND gates 142 and 144. Timer 140 functions to delay, for a period of between one and two seconds, the enable signal from second tone decoder 136 from reaching inhibit gates 142 and 144. As a result, either the first or second predetermined signals (corresponding to first digit and second digit tones) must be present at node 90 for at least one to two seconds to permit the enable signal from second tone decoder 136 and either of tone decoders 134 and 138 to coincide at the inputs of appropriate inhibit gate 142 or 144. In this manner, accidental operation of tone decode control 120 by other signals temporarily appearing at node 90 such as due to so-called "audio voice falsing" (voice signals which might fall within the tuning range of first and second or second and third tone decoders) is minimized.

As discussed, enable outputs of first and third tone decoders 134 and 138, respectively, form the second inputs of inhibit gates 142 and 144, respectively, and are passed to the respective inhibit gate outputs only upon coincidence with the enable signal from second tone decoder 136 as delayed by timer 140. An output from either gate 142 or 144, thus, indicates the presence of the appropriate predetermined signal at node 90 for the requisite minimum time interval.

Upon detection of a valid access touch-tone digit, the output from gate 142 sets flip flop 146, comprised of a pair of cross-coupled NOR gates 148 and 150. Also, the output from gate 142 simultaneously activates timer controller 152, the output of which controls switch 130. Switch 130 is in the normally closed state as shown in solid line in FIG. 7. In response to timer controller 152, switch 130 is placed in the open state as shown in dotted line in FIG. 7. Switch 130 will remain in the open state, precluding passage of signals between telephone port 24 and node 127 for so long as the output of gate 142 indicates the presence of a valid touch-tone access digit and for a short timed interval thereafter as determined by timer controller 152. Thereafter, switch 130 will again be in the closed state. Timer controller 152 and switch 130 therefore cooperate to block passage of the first touch-tone access digit tones from receiver port 28 to telephone port 24 thereby insuring that once receiver port 28 and telephone port 24 are coupled, the telephone line 12 has a dial tone to permit subsequent proper telephone dialing by the mobile unit (not shown). Were ports 28 and 24 to be prematurely coupled, the access tone would be taken as a number for dialing purposes by the telephone company equipment thus causing a wrong number to be dialed.

Figure 6:
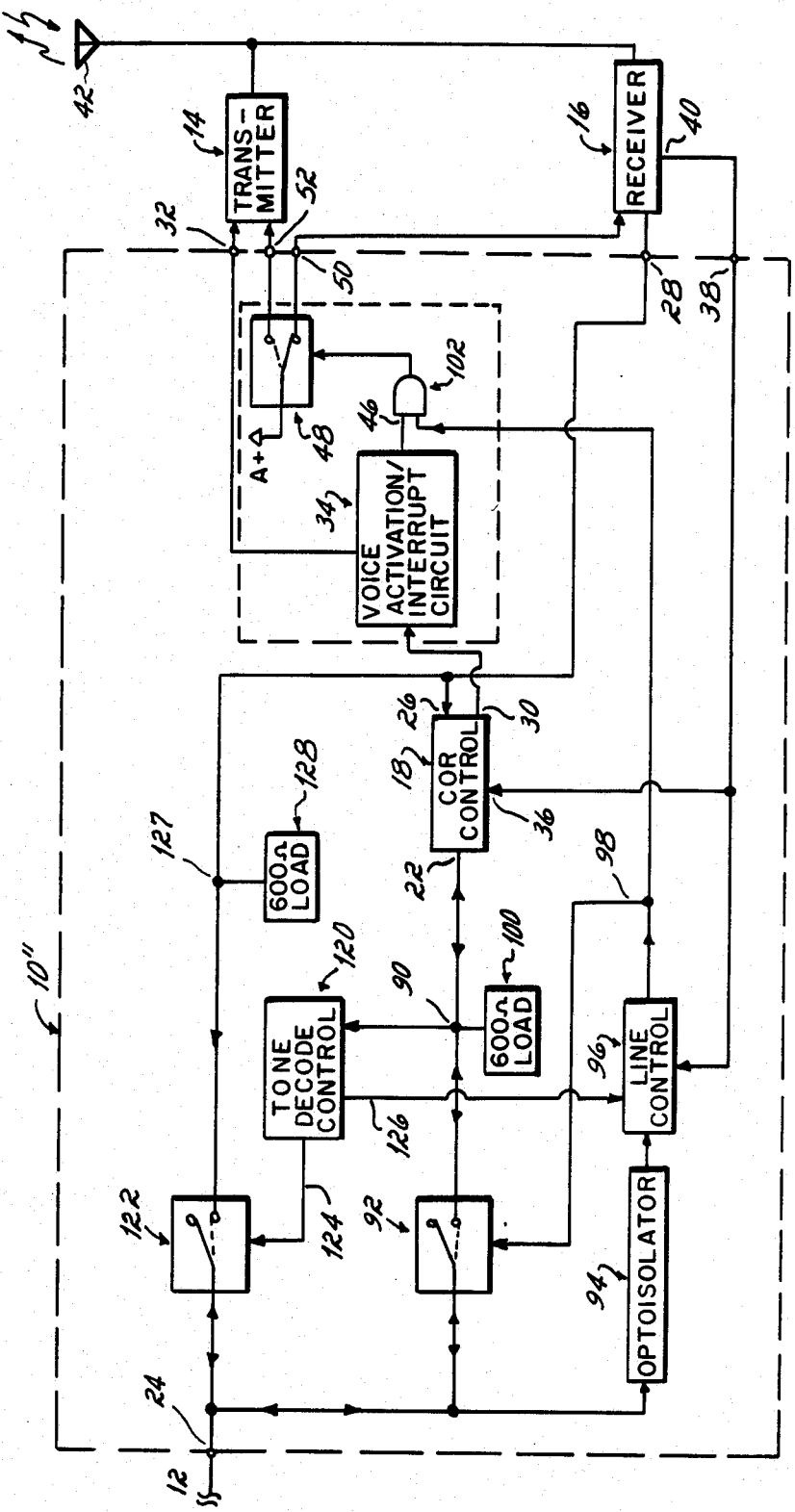
FIG. 6 is a block diagram of a further alternative embodiment of the communication switch circuit according to the principles of the present invention.

Switch 132, on the other hand, is in the normally open state as shown in solid line in FIG. 7 when flip-flop 146 is reset as will be discussed. When flip flop 146 is set by an output from inhibit gate 142, the output of flip-flop 146 will place switch 132 in the closed state, as shown in dotted line, thereby coupling port 24 to node 127 after switch 130 is again placed in the closed state. Accordingly, the output of timer controller 152 and flip-flop 146 cooperate to provide the access signal on output 124 as represented in FIG. 6.

Where the call is initiated due to operation of tone decode control 120, the dump signal on line 126 is necessary to terminate the call. Passage of time without conversation to reset timer 104 will not alone terminate the call because switch 122 will be maintained in the mobile-call state thereby still seizing telephone line 12.

Thus, the call will be terminated only by a high output from OR gate 154 (and, hence, a low output from gate 156 to line control 96) as will now be described.

Ordinarily, the output of OR gate 154 is low thus not affecting the state of flip-flop 146. Similarly, output 126 is high thus not dumping or discharging timing capacitor 110 of line control 96.

As will be appreciated from FIG. 7, one of three different input conditions to OR gate 154 will produce a high output therefrom. A high output will reset flip-flop 146 which will place switch 132 in the open state and will result in a low output or dump signal on line 126 thereby discharging timing capacitor 110. As a result, the call will be terminated.

The first input to OR gate 154 is an overall system reset from system timer 158. System timer 158 is preferably set coincidently with flip-flop 146 and establishes a maximum connection time, for example, five minutes. After that time, if the call was initiated by operation of tone decode control 120, the call terminates.

The second input to OR gate 154 is an activity timer 160 which is reset whenever a signal is received by receiver 16. To accomplish the reset, activity timer 160 is coupled to COR port 38 (the interconnection not shown in FIG. 6). Activity timer 160 is set for typically between thirty seconds and one minute and operates to terminate the call if no signals are received from a mobile unit (not shown) within the predetermined time interval of activity timer 160. The presence of a signal at receiver port 28 during that time will reset timer 160 which will then start anew the predetermined time interval.

The third input to OR gate 154 is from inhibit gate 144. The communication switch circuit 10″ may be returned to its stand-by or idle condition (call terminated) at any time upon detection of a valid dump touch-tone digit from either a telephone party (not shown) using telephone line 12 or a mobile unit (not shown). Of course, the dump digit tones must be present at node 90 for a sufficient time to generate the enable signal from second tone decoder 138 and from second tone decoder 136 as delayed by falsing timer 140 to provide an output from inhibit gate 144.

Any of the foregoing will result in termination of the call by (i) forcing switch 92 to be placed in the on-hook state due to discharge of capacitor 110, and (ii) placing switch 122 in the no-call state due to resetting of flip-flop 146.

By virtue of the foregoing, communication switch circuit 10″ permits initiation of calls by the user of a mobile unit (not shown). Further, either a telephone party or the mobile unit (not shown) can cause termination of the call at any time.

Figure 8:
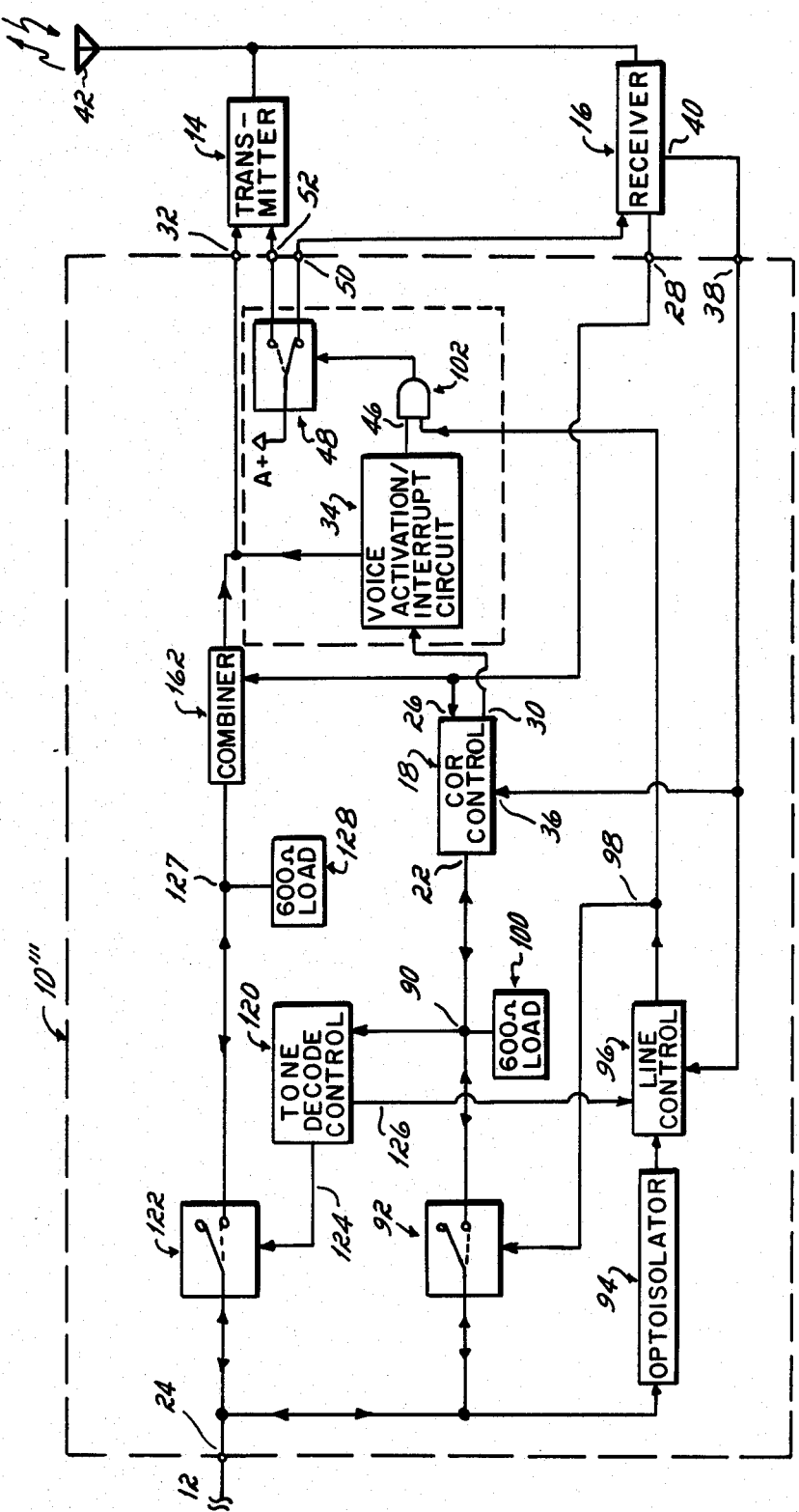
FIG. 8 is a further alternative embodiment of the communication switch circuit according to the principles of the present invention.

FIG. 8 is a block diagram of a further alternative embodiment of a communication switch circuit according to the principles of the invention which is compatible with duplex radio communication systems. Communication switch circuit 10‴ shown in FIG. 8 operates in substantially the same manner as communication switch circuit 10″ but includes a combiner 162 to permit operation in a duplex system if desired. Combiner 162 unidirectionally couples port 28 to node 127 and to transmitter port 32, and unidirectionally couples node 127 to transmitter port 32. For use in a simplex system, combiner 162 is redundant and could be dispensed with as shown in FIG. 6. However, the communication switch circuit of this invention is preferably adapted for use in a duplex system wherein transmitter 14 and receiver 16 may both be energized simultaneously. As they operate at different nominal frequencies as is well understood, no interference is created by simultaneous transmission and reception. What is required, however, is that signals from receiver port 28 be provided to transmitter port 32 for retransmission along with signals from telephone port 24.

For a duplex system (not shown), transmitter 14 and receiver 16 may be directly powered by a source of supply (A+) rather than through power ports 52, 50, respectively. Receiver 16 may thus be energized for reception of signals from a mobile unit (not shown) while transmitter 14 may be energized for transmission of signals at transmitter port 32 be they from telephone port 24 and/or from receiver port 28, the latter via combiner 162.

Figure 9:
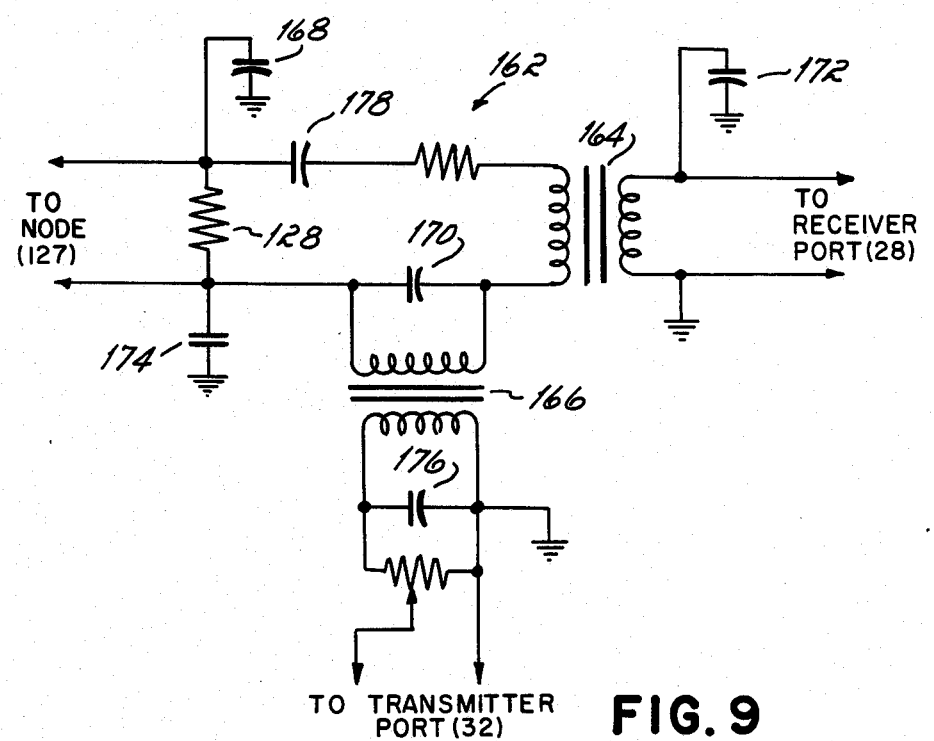
FIG. 9 is a schematic circuit of the combiner of FIG. 8.

Combiner 162 is shown in greater detail in FIG. 9 and comprises ring connected 600 ohm:600 ohm audio isolation transformer 164, 600 ohm:25 kilohm matching transformer 166, and 600 ohm line seize resistor 128 (the 600 ohm load shown coupled to node 127 in FIG. 8). Capacitors 168, 170, 172, 174 and 176 serve to bypass stray radio frequency energy and to suppress transcients as is well understood. Capacitor 178 is a coupling capacitor as is also well understood.

Signals at node 127 appearing across resistor 128 are coupled unidirectionally through transformer 166 to transmitter port 32 but not to receiver port 28 via isolation transformer 164. Signals from receiver port 28 are coupled unidirectionally through isolation transformer 164 to node 127 and further through transformer 166 to transmitter port 32.

In operation, COR control 18 will typically still operate to prevent transmission of signals present at telephone port 24 as above described. However, if the call is initiated by a mobile unit (not shown), switch 122 is in the mobile-call state whereby telephone port 24 is coupled to node 127 and, hence, to transmitter port 32 via combiner 162. Thus, for mobile unit initiated calls, signals from both telephone port 24 and receiver port 28 are simultaneously transmitted by transmitter 14. At all times, though, signals from receiver port 28 are coupled to transmitter port 32 and to node 90 (and hence to telephone port 24 via COR control 18 as well as when second switch 122 is in the mobile-call state). With a simplex communication system, the presence of signals from receiver port 28 at transmitter port 32 is superfluous because transmitter 14 is not energized, although this arrangement is required for duplex repeater systems.

The foregoing thus describes the various embodiments of a communication switch circuit according to the present invention. While the communication switch circuit has been disclosed in connection with a separate transmitter and receiver, it is well understood that the two may be combined into a single transceiver unit so as to share much of the receiver/transmitter electronics. With such a transceiver, the output from power ports 50, 52 should be connected to the transceiver so as to permit appropriate routing of signals within the transceiver and selective energization where appropriate to permit operation as receiver or a transmitter as desired. Also, while the invention has been particularly described for use with a telephone line, in the broader aspects of the invention, any line coupled to another communication network, e.g., telephone system, microwave link, etc., may be coupled to port 24 for operation with the communication switch circuit of this invention.

Having described the invention what is claimed is:

1. A communication switch circuit adapted to permit selective coupling of a telephone line to (i) a transmitter for transmission of signals from the telephone line to a mobile unit and (ii) a receiver for reception at the telephone line of signals from a mobile unit, the communication switch circuit comprising:
   a telephone port couplable to a telephone line;
   a transmitter port couplable to a transmitter;
   a receiver port couplable to a receiver;
   first means for coupling said telephone port to said transmitter port when signals are absent from said receiver port, to define a transmission state;
   keying means for permitting, in a transmitter-on state, transmission of signals by a transmitter couplable to said transmitter port, signals being present at said telephone port and said first means being in said transmission state defining said transmitter-on state, said keying means further for preventing, in a transmitter-off state, transmission of signals by a transmitter couplable to said transmitter port, said first means further for coupling said telephone port to said receiver port when signals are present at said receiver port and said keying means is in said transmitter-off state to define a receiver state; and
   interrupt means, operable when said keying means is in said transmitter-on state, for intermittently, temporarily placing said keying means in said transmitter-off state, whereby the presence of signals at said receiver port while said keying means is temporarily in said transmitter-off state places said first means in said receiving state thereby interrupting transmission of a transmitter couplable to said transmitter port and coupling said telephone port to said receiver port.

2. The communication switch circuit of claim 1 wherein said first means is coupled to said telephone port via a node, said communication switch circuit further comprising:
   switch means for coupling said telephone port to said node, to define an off-hook state, said switch means having an on-hook state wherein said telephone port and said node are not coupled by said switch means;
   line seizing impedance means coupled to said node for seizing a telephone line couplable to said telephone port when said switch means is in said off-hook state; and
   first control means for detecting the presence of telephone signals at said telephone port and for placing said switch means in said off-hook state once said detection occurs.

3. The communication switch circuit of claim 2 further comprising second control means for placing said keying means in said transmitter-off state when said switch means is in said on-hook state.

4. The communication switch circuit of claim 3, further comprising timer means for maintaining said switch means in said off-hook state for a predetermined period of time after first being placed in said off-hook state and thereafter placing said switch means in said on-hook state.

5. The communication switch circuit of claim 4 wherein said timer means is resettable such that said predetermined period of time begins anew when said timer means is reset, said communication switch circuit further comprising reset means for resetting said timer during the presence of signals at said receiver port when said switch means is in said off-hook state, whereby said switch means remains in said off-hook state for said predetermined period of time after the presence of signals at said receiver port terminates.

6. In a simplex system having a transmitter for selectively transmitting first signals from a land line to a mobile transceiver when said transmitter is energized and a receiver for receiving second signals from a mobile transceiver, and for selectively coupling the second signals to the land line, when the transmitter is deenergized, a communication switch circuit comprising:
   keying means for energizing and deenergizing said transmitter during the presence and absence, respectively, of said first signals on said land line;
   first interrupt means for intermittently, temporarily deenergizing said transmitter during energization thereof by said keying means; and
   second interrupt means for preventing energization of said transmitter by said keying means during reception of said second signals by said receiver for a period of time defined as the duration of said reception of said second signals after coincidence of reception of said second signals and deenergization of said transmitter by either of said keying means or said first interrupt means.

7. In the system of claim 6, the communication switch circuit further comprising:
   means for coupling said land line to said transmitter when said second signals are not being received by said receiver and for coupling said land line to said receiver when said second signals are being received by said receiver and said transmitter is deenergized.

8. In the system of claim 6, the communication switch circuit further comprising:
   a port;
   first means for coupling said port to said transmitter when said second signals are not being received by said receiver and for coupling said port to said receiver when said second signals are being received by said receiver and said transmitter is deenergized;
   switch means for coupling said land line to said port, to define an off-hook state, said second switch means having an on-hook state wherein said land line and said port are uncoupled; and
   first control means for detecting the presence of signals on said land line and for placing switch means in said off-hook state once said detection occurs.

9. In the system of claim 8, the communication switch circuit further comprising second control means for preventing energization of said transmitter by said keying means when said switch means is in said on-hook state.

10. In the system of claim 9, the communication switch circuit further comprising:
    timer means for maintaining said switch means in said off-hook state for a predetermined period of time after first being placed in said off-hook state and thereafter placing said switch means in said on-hook state.

11. In the system of claim 10, wherein said timer means is resettable such that said predetermined period of time begins anew when said timer means is reset, the communication switch circuit further comprising reset means for resetting said timer means during reception of said second signals by said receiver when said switch means is in said off-hook state, whereby said switch means remains in said off-hook state for said predetermined period of time after said reception of said second signals by said receiver terminates.

12. A communication switch circuit adapted to permit selective coupling of a telephone line to (i) a transmitter for transmission of signals from the telephone line to a mobile unit and (ii) a receiver for reception at the telephone line of signals from a mobile unit, the communication switch circuit comprising:
  a transmitter port couplable to a transmitter;
  a receiver port couplable to a receiver;
  a telephone port couplable to a telephone line;
  first means coupled to said telephone port via a first node for coupling said telephone port to said transmitter port when signals are absent from said receiver port, to define a transmission state;
  first switch means for coupling said telephone port to said first node, to define an off-hook state, said first switch means having an on-hook state wherein said telephone port and said first node are not coupled by said first switch means;
  combiner means coupled to said telephone port via a second node for unidirectionally coupling said telephone port to said transmitter port and for unidirectionally coupling said receiver port to said telephone port;
  first decoder means for generating an access signal in response to a first predetermined signal at said first node;
  second switch means for coupling said telephone port to said second node when said access signal is present, to define a mobile-call state, said second switch means having a no-call state wherein said telephone port and said second node are not coupled by said second switch means;
  first line seizing impedance means coupled to said first node for seizing a telephone line couplable to said telephone port when said first switch means is in said off-hook state;
  second line seizing impedance means coupled to said second node for seizing a telephone line couplable to said telephone port when said second switch means is in said mobile-call state;
  first control means for detecting the presence of signals at said telephone port and for placing said first switch means in said off-hook state once said detection occurs;
  keying means for permitting, in a transmitter-on state, transmission of signals by a transmitter couplable to said transmitter port when signals are present at said first telephone port and said first means is in said transmission state to define a transmitter-on state, and for preventing, in a transmitter-off state, transmission of signals by a transmitter couplable to said transmitter port, said first means further for coupling said telephone port to said receiver port when signals are present at said receiver port and said keying means is in said transmitter-off state to define a receiver state; and
  interrupt means, operable when said keying means is in said transmitter-on state, for intermittently, temporarily placing said keying means in said transmitter-off state, whereby the presence of signals at said receiver port while said keying means is temporarily in said transmitter-off state places said first means in said receiver state thereby interrupting transmission by a transmitter couplable to said transmitter port and coupling said telephone port to said receiver port.

13. The communication switch circuit of claim 12 further comprising falsing timer means for preventing said generation of said access signal until said first predetermined signal has been present at said first node for a predetermined period of time.

14. The communication switch circuit of claim 12 further comprising first timer means for delaying coupling of said telephone port to said second node for a first predetermined period of time after generation of said access signal.

15. The communication switch circuit of claim 14 further comprising falsing timer means for preventing said generation of said access signal until said first predetermined signal has been present at said first node for a second predetermined period of time.

16. The communication switch circuit of claim 15 further comprising second control means for placing said keying means in said transmitter-off state when said first switch means is in said on-hook state.

17. The communication switch circuit of claim 16 further comprising second timer means for maintaining said first switch means in said off-hook state for a third predetermined period of time after first being placed in said off-hook state and thereafter placing said first switch means in said on-hook state.

18. The communication switch circuit of claim 17 wherein said second timer means is resettable such that said third predetermined period of time begins anew when said second timer means is reset, the communication switch circuit further comprising reset means for resetting said second timer means during the presence of signals at said receiver port when said first switch means is in said off-hook state, whereby said first switch means remains in said off-hook state for said third predetermined period of time after the presence of signals at said receiver port terminates.

19. The communication switch circuit of claim 12 further comprising:
  second decoder means for generating a dump signal in response to a second predetermined signal at said first node; and
  second control means for placing, in response to said dump signal being generated, said second switch means in assume said no-call state and said first switch means in said on-hook position.

20. The communication switch circuit of claim 19, further comprising first timer means for delaying coupling of said telephone port to said second node for a first predetermined period of time after generation of said access signal.

21. The communication switch circuit of claim 19 further comprising:
  first falsing timer means for preventing said generation of said access signal until said first predetermined signal has been present at said first node for a first predetermined period of time; and
  second falsing timer means for preventing said generation of said dump signal until said second predetermined signal has been present at said first node for a second predetermined period of time.

22. The communication switch circuit of claim 21 further comprising first timer means for delaying coupling of said telephone port to said second node for a third predetermined period of time after generation of said access signal.

23. The communication switch circuit of claim 22 further comprising third control means for placing said keying means in said transmitter-off state when said first switch means is in said on-hook state.

24. The communication switch circuit of claim 23 further comprising second timer means for maintaining said first switch means in said off-hook state for a fourth predetermined period of time after being placed in said off-hook state and thereafter placing said first switch means in said on-hook state.

25. The communication switch circuit of claim 24 wherein said second timer means is resettable such that said fourth predetermined period of time begins anew when said second timer means is reset, the communication switch circuit further comprising reset means for resetting said second timer means during the presence of signals at said receiver port when said first switch means is in said off-hook state, whereby said first switch means remains in said off-hook state for said fourth predetermined period of time after the presence of signals at said receiver port terminates.

26. A communication switch circuit adapted to permit selective coupling of a telephone line to (i) a transmitter for transmission of signals from the telephone line to a mobile unit and (ii) a receiver for reception at the telephone line of signals from a mobile unit, the communication switch circuit comprising:

a transmitter port couplable to a transmitter;
a receiver port couplable to a receiver;
a telephone port couplable to a telephone line;
first means coupled to said telephone port via a node for coupling said telephone port to said transmitter port when signals are absent from said receiver port, to define a transmission state;
switch means for coupling said telephone port to said node, to define an off-hook state, said switch means having an on-hook state wherein said telephone port and said node are not coupled by said switch means;
first control means for detecting the presence of signals at said telephone port and for placing said switch means in said off-hook state once said detection occurs;
line seizing impedance means coupled to said node for seizing a telephone line couplable to said telephone port when said switch means is in said off-hook state;
keying means for permitting, in a transmitter-on state, transmission of signals by a transmitter couplable to said transmitter port when signals are present at said telephone port and said first means is in said transmission state to define a transmitter-on state, and for preventing, in a transmitter-off state, transmission of signals by a transmitter couplable to said transmitter port, said first means further for coupling said telephone port to said receiver port when signals are present at said receiver port and said keying means is in said transmitter-off state to define a receiver state;
interrupt means, operable when said keying means is in said transmitter-on state, for intermittently, temporarily placing said keying means in said transmitter-off state, whereby the presence of signals at said receiver port while said keying means is temporarily in said transmitter-off state places said first means in said receiver state thereby interrupting transmission by a transmitter couplable to said transmitter port and coupling said telephone port to said receiver port;
decoder means for generating a dump signal in response to a first predetermined signal at said node; and
second control means for placing said switch means in said on-hook position in response to said dump signal being generated.

27. The communication switch circuit of claim 26 further comprising falsing timer means for preventing said generation of said dump signal until said first predetermined signal has been present at said node for a first predetermined period of time.

28. The communication switch circuit of claim 27 further comprising third control means for placing said keying means in said transmitter-off state when said switch means is in said on-hook state.

29. The communication switch circuit of claim 28 further comprising first timer means for maintaining said switch means in said off-hook state for a second predetermined period of time after being placed in said off-hook state and thereafter placing said switch means in said on-hook state.

30. The communication switch circuit of claim 29 wherein said first timer means is resettable such that said second predetermined period of time begins anew when said first timer means is reset, the communication switch circuit further comprising reset means for resetting said first timer means during the presence of signals at said receiver port when said switch means is in said off-hook state, whereby said switch means remains in said off-hook state for said second predetermined period of time after the presence of signals at said receiver port terminates.

* * * * *